UNITED STATES PATENT OFFICE.

ANSON C. TICHENOR, OF SAN FRANCISCO, CALIFORNIA.

ELECTROLYTE.

SPECIFICATION forming part of Letters Patent No. 363,562, dated May 24, 1887.

Application filed June 7, 1886. Serial No. 204,414. (Specimens.)

*To all whom it may concern:*

Be it known that I, ANSON C. TICHENOR, of the city and county of San Francisco, State of California, have invented an Improvement in Electrolytes; and I hereby declare the following to be a full, clear, and exact description of the same.

My invention relates to an improved electrolyte to be used in galvanic batteries for the production of an electric current therein.

It consists of a solution or mixture in water of a certain earth which is found in various parts of California.

The constituent parts and proportions thereof composing said earth are as follows: silica, 72.05 per cent.; peroxide of iron, 4.85 per cent.; alumina, 4.35 per cent.; lime, a trace; magnesia, 2.50 per cent.; sulphuric acid, 5.32 per cent.; water and loss, 10.93 per cent. This earth has a grayish color, and is of such consistency that it is held together in large lumps or masses, but may be easily broken and crushed with the fingers after short exposure to the air, being of an extremely friable nature. It is very fine, having no large or hard particles in it, and is easily reduced to a nearly or quite impalpable powder. This earth I place within the cell or cells of the battery, pouring in a sufficient quantity of water to fill the cell to the proper depth, when the action will immediately commence. Placed in a battery composed of positive and negative plates, the action is very continuous, ringing a bell for weeks in succession without any change in the solution or mixture, and apparently without effect upon the zinc plates. If the plates are placed in the cell or cells in the usual vertical position, this earth may be thrown in around them so as to fill the cell to the depth of one-half or more, and the cell is then filled up with water.

In some cases I have placed some of the earth in the bottom of a cell, then laid one of the plates upon the top, another layer of the earth, and the plate of opposite polarity above this, and so on, thus making a pile which would fill the cell, after which I have filled it with water, as before, making the proper connections for the transmission of the current.

Having thus described my invention, what I claim as new, and desire to secure by Letters Patent, is—

A galvanic cell or cells having electrodes consisting of different metals in contact with an electrolyte or exciting-fluid composed of an earth whose component parts are silica, peroxide of iron, alumina, lime, magnesia, sulphuric acid, and water, of about the proportions herein named, mixed with or dissolved in water, substantially as described.

In witness whereof I have hereunto set my hand.

ANSON C. TICHENOR.

Witnesses:
S. H. NOURSE,
H. C. LEE.